United States Patent [19]
Cyr et al.

[11] Patent Number: 5,305,431
[45] Date of Patent: Apr. 19, 1994

[54] METHOD AND SYSTEM FOR RENDERING POLYGONS ON A RASTER DISPLAY

[75] Inventors: Michael P. Cyr; William F. Lawless, both of Red Hook; Terrance L. Staley, II, Highland, all of N.Y.

[73] Assignee: International Business Machines Corporation, Armonk, N.Y.

[21] Appl. No.: 931,735

[22] Filed: Aug. 18, 1992

[51] Int. Cl.$^5$ ............................................. G06F 15/62
[52] U.S. Cl. .................................................... 395/143
[58] Field of Search ................. 395/133, 143, 141; 345/135, 136, 144

[56] References Cited
U.S. PATENT DOCUMENTS

| | | | |
|---|---|---|---|
| 4,481,594 | 11/1984 | Staggs et al. | 364/521 |
| 4,745,575 | 5/1988 | Hawes | 364/900 |
| 4,763,119 | 8/1988 | Matsubara et al. | 340/747 |
| 4,783,650 | 11/1988 | Bugg | 340/748 |
| 4,914,607 | 4/1990 | Takanashi et al. | 364/521 |
| 4,914,729 | 4/1990 | Omori et al. | 340/703 |
| 5,016,001 | 5/1991 | Minagawa et al. | 340/747 |
| 5,093,905 | 3/1992 | Kubota | 395/143 |
| 5,136,689 | 8/1992 | Waller | 395/143 |
| 5,208,909 | 5/1993 | Corona et al. | 395/155 |

OTHER PUBLICATIONS

J. D. Foley et al., "Fundamentals of Interactive Computer Graphics"; pp. 432-436 and 456-460 (1982).
O'Reilly & Associates, Inc. "X Protocol Reference Manual for X Version 11, vol. 0", pp. 115-116 (May 1990).
J. D. Foley et al., "Computer Graphics Principles and Practice", Second Edition, pp. 986-992 (1990).

Primary Examiner—Phu K. Nguyen
Attorney, Agent, or Firm—Heslin & Rothenberg

[57] ABSTRACT

Outlines of a polygon are rendered using a set of rules to determine whether each pixel defining the polygon is to be activated. Following the set of rules, the pixel is not activated when the pixel is the last pixel of the line being drawn in a negative direction or the pixel is the first pixel of the line being drawn in a positive direction. Further, the pixel is capable of being activated when the center of the pixel lies on or to the right of the line, the pixel is the first pixel of a horizontal group of pixels and the line is located in the fifth or seventh octant, or the pixel is the last pixel of the horizontal group and the line is located in the first or third octant. The value determined from the above rules is then exclusive ORed with the current pixel value to determine if the pixel is to be rendered. After the outline is rendered, the outline is filled.

38 Claims, 8 Drawing Sheets

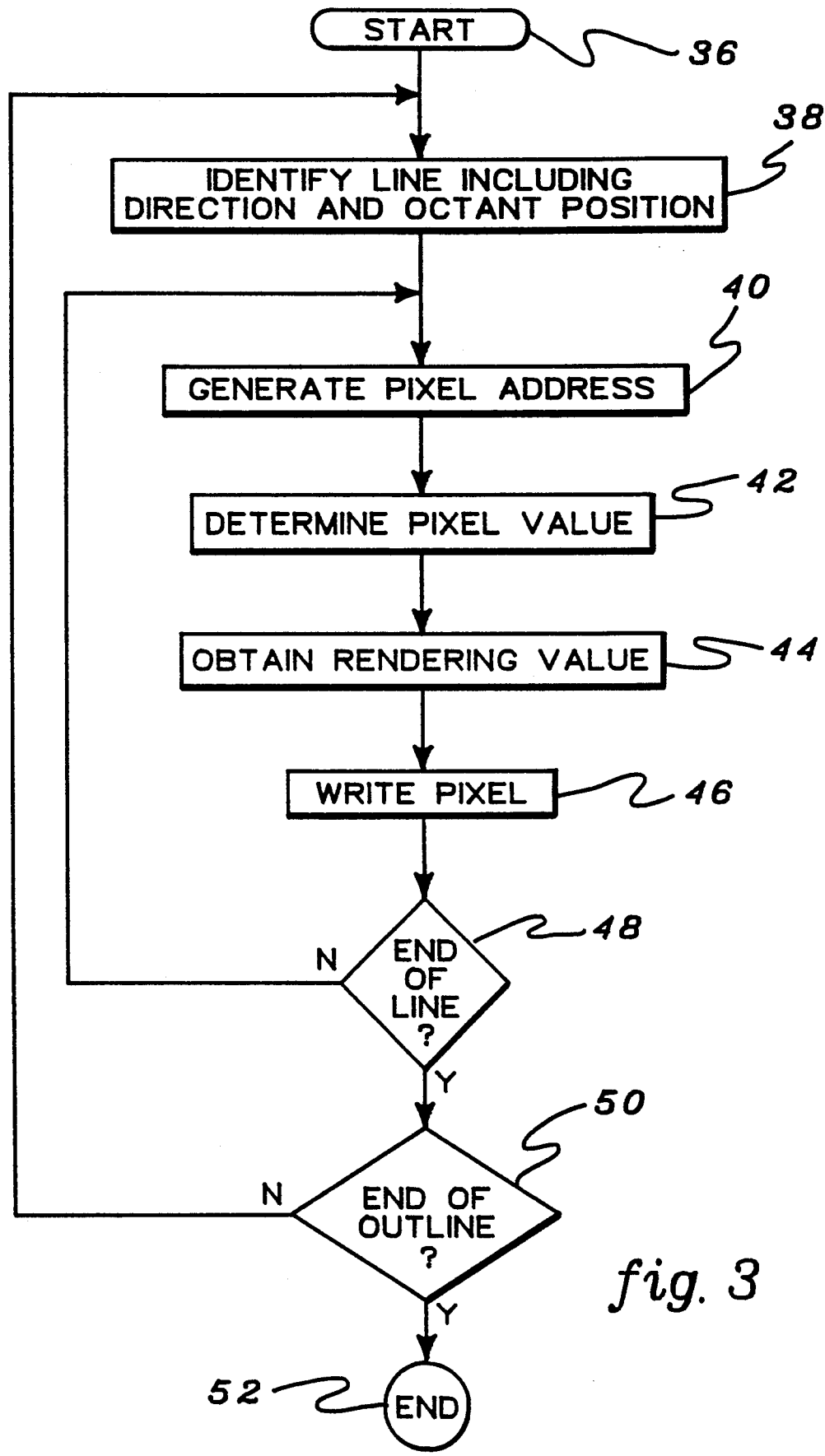

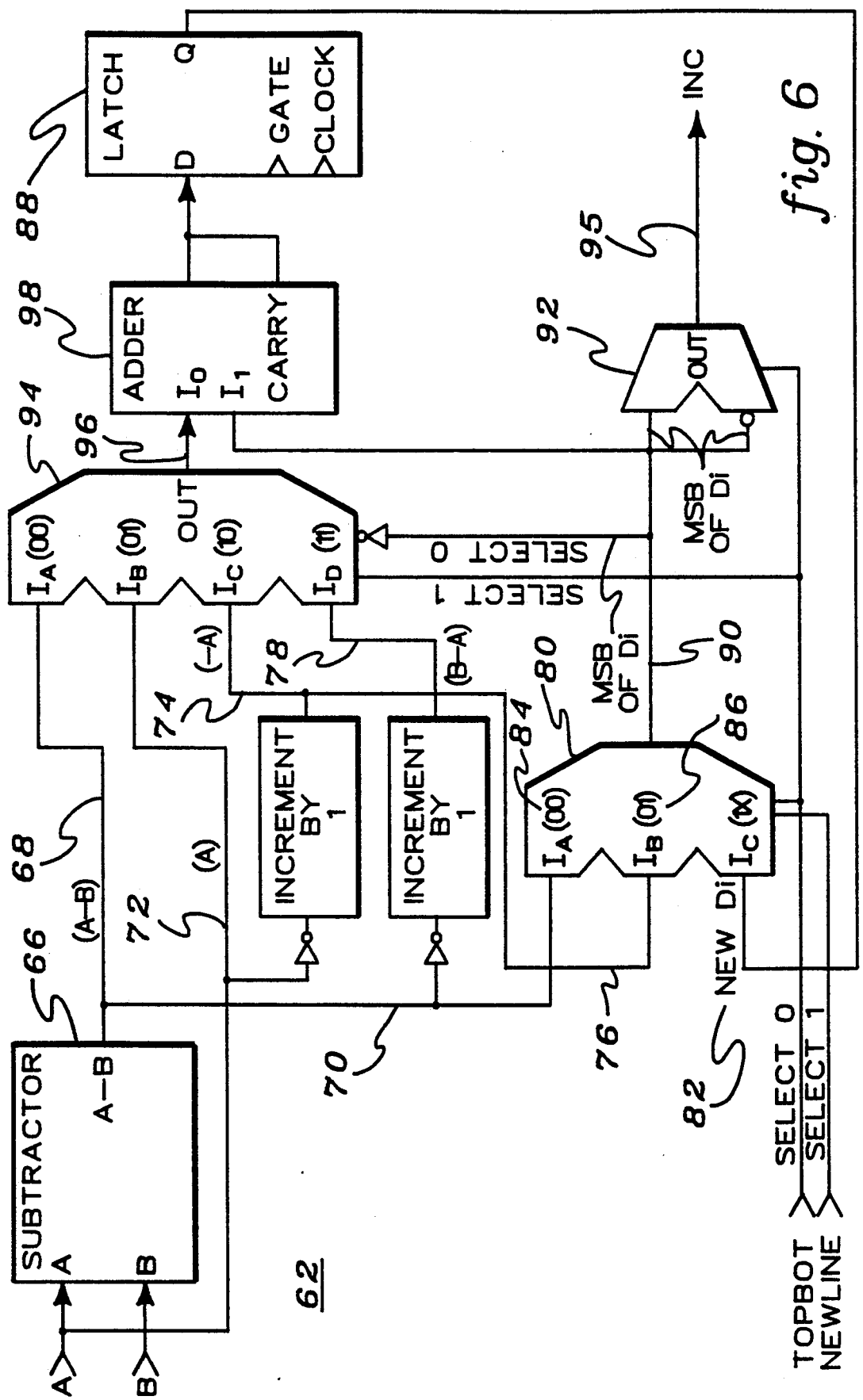

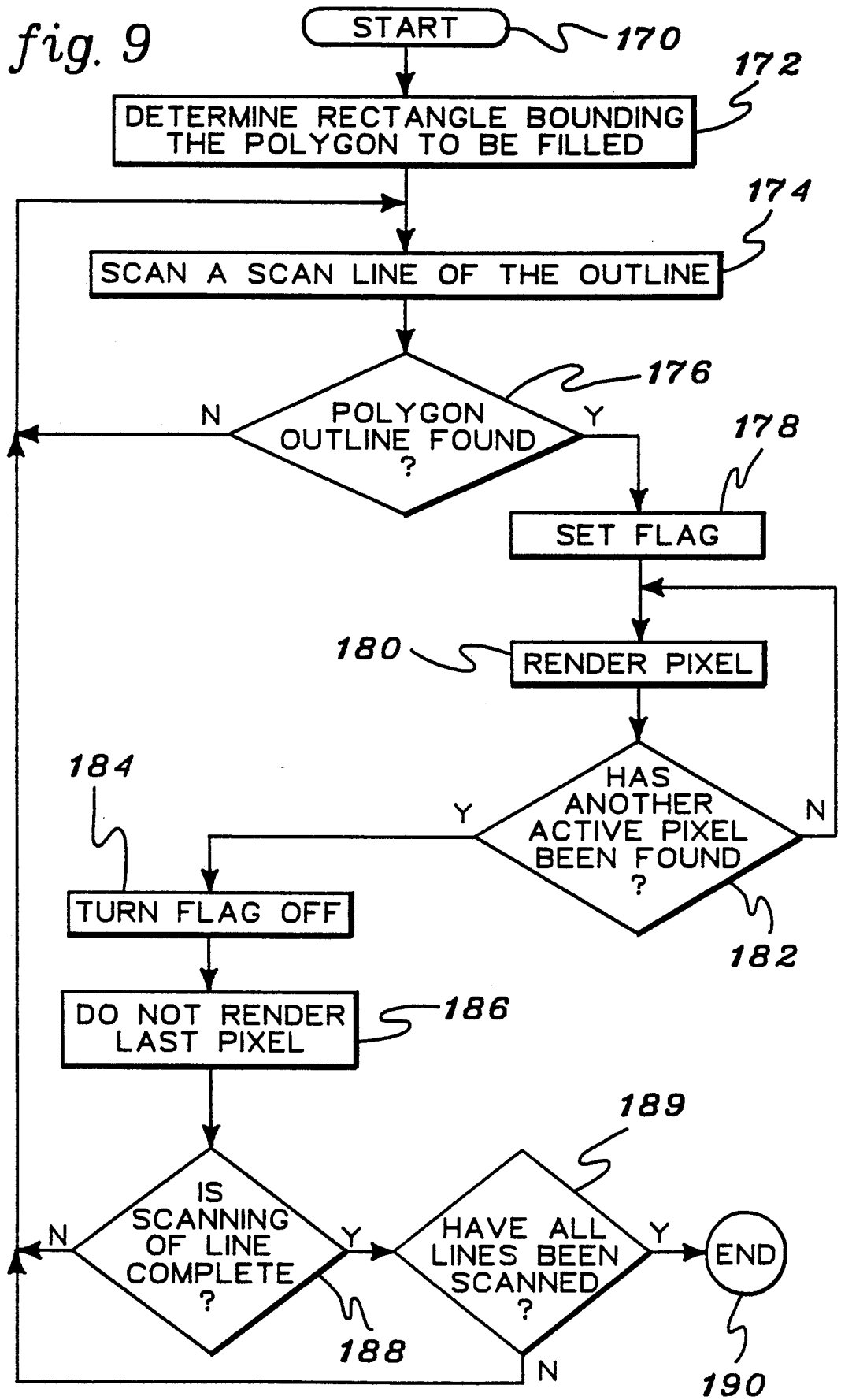

METHOD AND SYSTEM FOR RENDERING POLYGONS ON A RASTER DISPLAY

TECHNICAL FIELD

This invention relates in general to graphics processing, and more particularly, to a technique for rendering and filling a polygon outline.

BACKGROUND ART

In graphics processing, the ability to render polygons or images which are not blurred in an easy and efficient manner is important. Previously, various techniques for rendering polygons have been implemented. These techniques include, for example, an Ordered Edge List algorithm and a Bresenham procedure, both of which are described in J. D. Foley et al., *Fundamentals of Interactive Computer Graphics* (1982). Other techniques are described in, for example, U.S. Pat. No. 4,763,119 entitled "Image Processing System For Area Filling Of Graphics," issued on Aug. 9, 1988, and U.S. Pat. No. 4,745,575 entitled "Area Filling Hardware For A Color Graphics Frame Buffer," issued on May 17, 1988, both assigned to International Business Machines Corporation.

In U.S. Pat. No. 4,763,119, an area fill technique for graphic images is disclosed wherein the contour lines constituting an image are given in a series of line segments and horizontal line segments are ignored. The pixels of each line segment are stored in a work memory such that each line segment is represented by one pixel per horizontal line. An even number of contour line pixels exist in each horizontal line in the work memory and, area fill can be realized by scanning each horizontal line in the memory and turning on pixel memory cells from an odd numbered contour line pixel to an even numbered contour line pixel.

In U.S. Pat. No. 4,745,575 a graphics display apparatus is described. To display shaded areas, additional control logic draws an outline of the area in an auxiliary memory using Bresenham's Algorithm. Edge filling logic consisting of Exclusive-OR gates is used to draw the filled area in the refresh buffer as the outline is read from an auxiliary memory into the refresh buffer.

In graphics processing, it is advantageous to be able to render polygons using the known X window EvenOdd fill rules, which are described in *X Protocol Reference Manual for X Version* 11, Volume 0 by O'Reilly & Associates, Inc (May 1990), which is hereby incorporated by reference. However, many of the previously known techniques, especially those which are mostly hardware implemented, are not capable of satisfying all of the X Window EvenOdd fill rules and others are too complex or inefficient. In addition, some of the rendering techniques are mostly software implemented and require complex data structures which are difficult to use and reduce the processing speed.

Therefore, a need exists for a polygon rendering technique which is faster and less complex than previously implemented methods. Further, there exists a need for a rendering technique which is capable of conforming to the X EvenOdd fill rules. Still further, a need exists for a method and system for rendering polygons in which the pixels on or below or to the right of the lines of the polygon are rendered. A yet further need exists for a polygon rendering technique which does not need complex data structures and is capable of being implemented mostly in hardware.

DISCLOSURE OF INVENTION

The shortcomings of the prior art are overcome and additional advantages are provided in accordance with the principles of the present invention through the provision of a method for rendering a polygon outline.

The polygon outline is comprised of a plurality of lines and each line comprises a number of pixels. Each line to be rendered is identified and a rendering direction and an octant position for each line is determined. For each pixel of a line, a set of rules is used to determine a value for the pixel. The set of rules include setting the value to a first value when the pixel is a first pixel of a line and the rendering direction of the line is positive or when the pixel is the last pixel of the line and the rendering direction is negative. The rules also include setting the value to a second value when either a center of the pixel lies on the line, the pixel is the first pixel of a horizontal group of pixels of the line and the line is positioned in the fifth or the seventh octant, or the pixel is the last pixel of a horizontal group of pixels of the line and the line is in the first or the third octant. The determined value is then exclusive ORed with a current pixel value to determine a render value of the pixel. The render value is written to a buffer.

In a further embodiment of the invention, each line is identified by a beginning and ending coordinate. The beginning coordinate includes a first horizontal component and a first vertical component and the ending coordinate includes a second horizontal component and a second vertical component.

In a yet a further embodiment, in order to determine the octant position of a line, the first horizontal component is compared to the second horizontal component to obtain a horizontal direction, the first vertical component is compared to the second vertical component to obtain a vertical direction, the first horizontal component is subtracted from the second horizontal component to obtain a horizontal change in the horizontal direction, the first vertical component is subtracted from the second vertical component to obtain a vertical change in the vertical direction, the horizontal and vertical changes are compared to determine a change signal and the octant position is determined by using the horizontal and vertical direction and the change signal.

In another embodiment of the invention, the rendered outline is filled. In one example in order to fill the outline, a rectangle surrounding the outline is determined. The rectangle defines an area having a plurality of scan lines. Each of the scan lines is scanned to determine sets of active pixels in each scan line and each set comprises a first and a second active pixel. In between the first and second active pixels are inactive pixels. For each scan line, the first active pixels in each set of active pixels and each of the inactive pixels in between the set of active pixels are rendered.

In another aspect of the invention, a system for rendering a polygon outline is provided. The polygon outline is comprised of a plurality of lines and each line comprises a number of pixels. The system includes means for identifying each line to be rendered and means for determining a rendering direction and an octant position for each line. Also, the system includes means for using a set of rules to determine a value for each pixel. The set of rules include setting the value to a first value when the pixel is a first pixel of a line and the rendering direction of the line is positive or when the pixel is the last pixel of the line and the rendering direction is negative. The rules also include for setting the value to a second value when either a center of the pixel lies on the line, the pixel is the first pixel of a horizontal group of pixels of the line and the line is positioned in the fifth or the seventh octant, or the pixel is the last pixel of a horizontal group of pixels of the line and the line is in the first or the third octant. The system includes means for exclusive ORing the determined value with a current pixel value to determine a render value of the pixel. The render value is written to a buffer.

In another embodiment of the invention, the system fills the rendered outline. In one example in order to fill the outline, the system includes means for determining a rectangle surrounding the outline. The rectangle defines an area having a plurality of scan lines. Further, means are included for scanning each of the scan lines to determine sets of active pixels in each scan line wherein each set comprises a first and a second active pixel. In between the first and second active pixels are inactive pixels. For each scan line, means are included for rendering the first active pixels in each set of active pixels and each of the inactive pixels in between the set of active pixels.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 3 depicts one embodiment of a logic flow diagram of the polygon outline rendering technique of the present invention;

FIG. 6 is a schematic block diagram of the increment unit shown in FIG. 4;

FIG. 9 depicts one example of a flow diagram of the technique for filling a polygon outline, in accordance with the principles of the present invention.

BEST MODE FOR CARRYING OUT THE INVENTION

Figure 1:
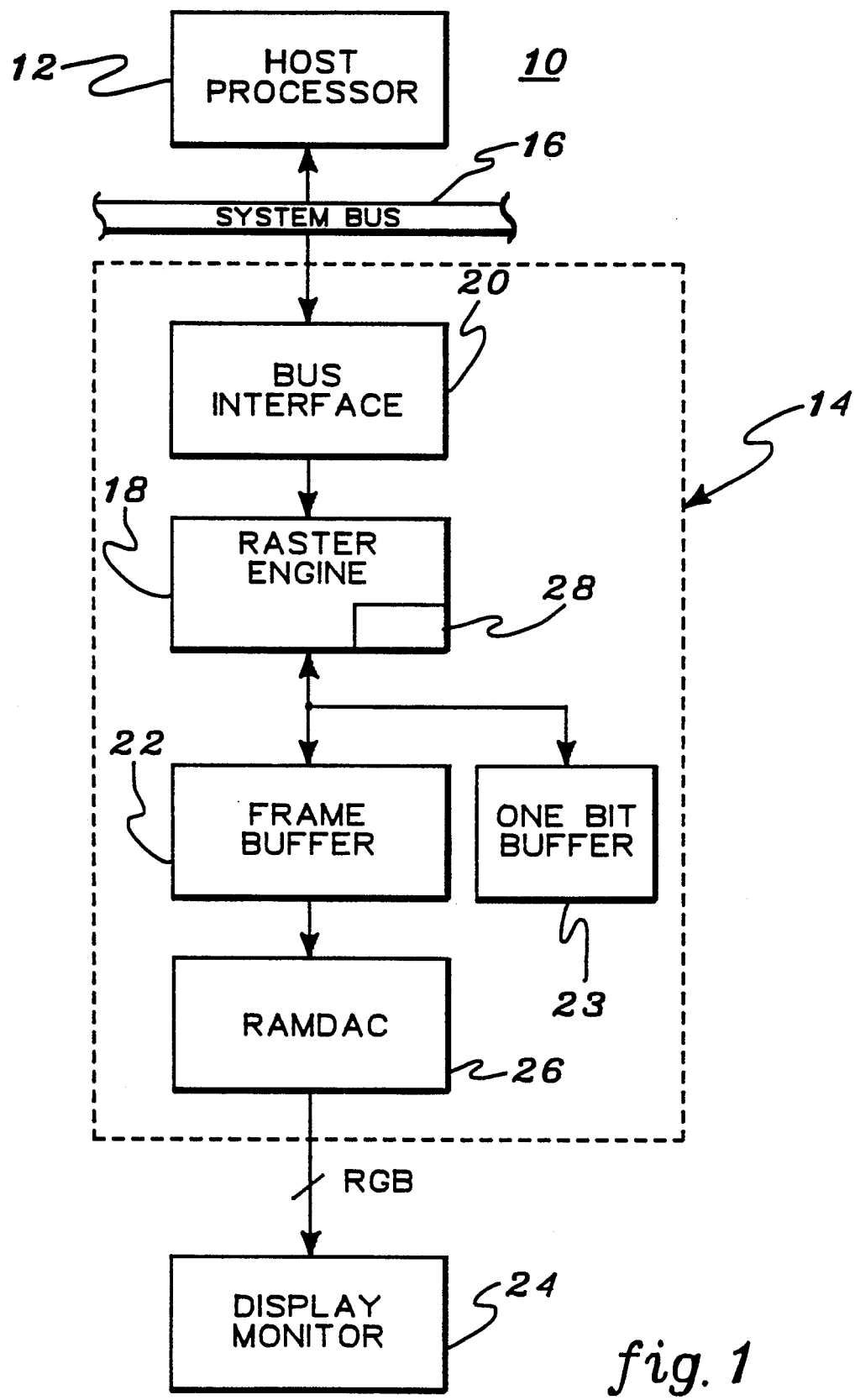
FIG. 1 depicts a block diagram of one embodiment of a computer graphics system incorporating the rendering technique of the present invention.

Referring to FIG. 1, a system 10 incorporating the present invention includes a host processor 12 and a graphics adapter or subsystem 14 coupled to host processor 12 via a system bus 16. Host processor 12 may be a RISC- based processor, such as that of an International Business Machine's RISC System/6000 workstation, while bus 16 may be a bus, such as the Micro Channel bus having a 32-bit data path. (RISC System/6000 and Micro Channel are trademarks of International Business Machine Corporation.)

In the particular example shown, graphics subsystem 14 includes a two-dimensional (2-D) graphics processor or raster engine 18 coupled to bus 16 via a bus interface 20. Graphics processor 18 is in turn coupled to a frame buffer 22, which stores color information for each picture element (pixel or pel) of a display and a one bit frame buffer 23, described below. A typical display in a graphics workstation, such as in the RISC System/6000 referred to above, may span 1280 pixels horizontally and 1024 pixels vertically. Frame buffer 22 contains a predetermined number of bit planes for color information (8 and 24 planes are common numbers) and, optionally, additional planes for storing window information, overlay information, and the like.

Color information is periodically scanned out of frame buffer 22 along horizontal scan lines and supplied to the color (RGB) inputs of a display monitor 24 via a RAMDAC 26. In a manner that is conventional in the art, RAMDAC 26 consists of a ra.:dom access memory (RAM) (not separately shown) that is addressed by the color output from frame buffer 22 and whose output drives a digital-to-analog converter (DAC) for each of the RGB color components. The RAM of RAMDAC 26 functions as a color palette or lookup table for performing desired conversions between the output color from frame buffer 22 and the color supplied to monitor 24. Although in the system shown in FIG. 1 the display device is a monitor, the present invention may also be used with other display devices such as printers.

Graphics processor 18, which includes the rendering logic 28 of the present invention, accepts data from host processor 12, which may represent a straight line segment or vector in terms of the coordinates of its endpoints, and "rasterizes" that data by converting it to a form suitable for storage in frame buffer 22 and ultimately display on monitor 24. In particular, graphics processor 18 renders an image outline and fills in the outline using the rendering technique of the present invention.

Figure 2:
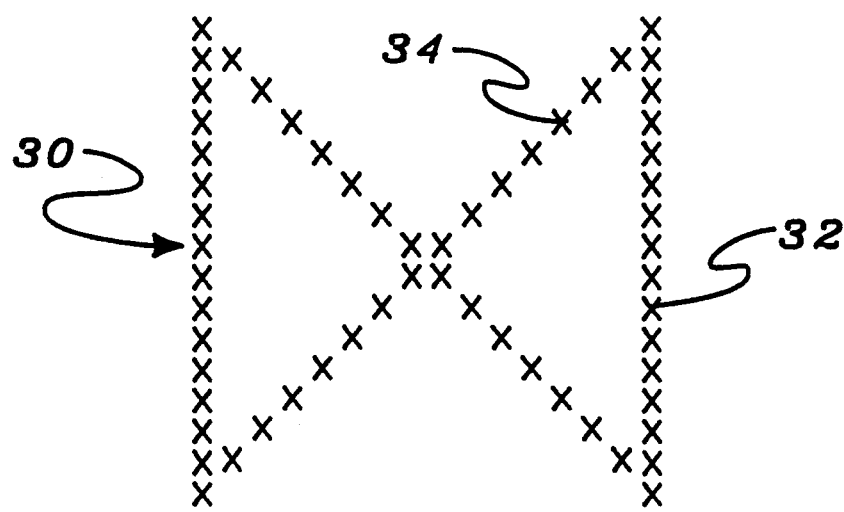
FIG. 2 illustrates one example of a polygon outline.
Figure 5:
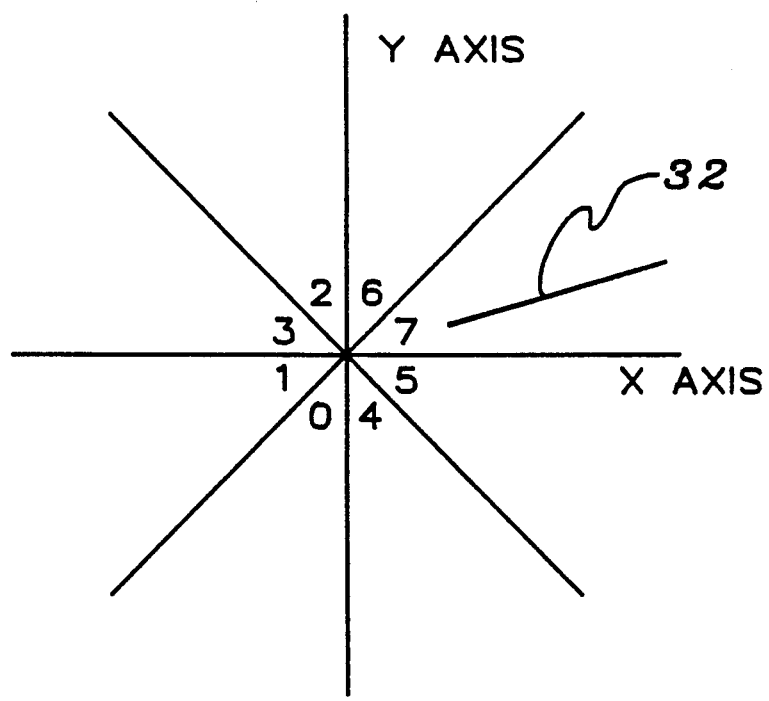
FIG. 5 illustrates one example of the eight octants in which a line may be positioned, in accordance with the principles of the present invention.

Referring to FIG. 2, a polygon outline 30 consists of one or more lines 32 and each of the lines is made up of a plurality of pixels 34. That is, one or more pixels are used to identify the ideal or true line, such as line 32 depicted in FIG. 2. With reference to FIGS. 3–7 a technique for rendering outline 30 is described in detail, in accordance with the principles of the present invention.

FIG. 3 depicts one example of a flow diagram of the technique for rendering a polygon outline, in accordance with the principles of the present invention. Upon invoking the technique (STEP 36), one of lines 32 of polygon outline 30 to be rendered is identified (as described below, if the line is a horizontal line, then it is not rendered) and a rendering direction and an octant positioning of the line (described below), are obtained (STEP 38). Subsequently, one of a number of pixels defining the ideal line is determined by generating an address in memory, such as a video random access memory (VRAM), associated with the pixel (STEP 40). Thereafter, a set of rendering rules developed in accordance with the principles of the present invention, is used to determine a value (for example, a zero or a one) for the pixel (STEP 42). This value is used to obtain a rendering value for the pixel, which indicates whether the pixel is to be activated (STEP 44). In one example, if the rendering value of the pixel is one, then the pixel is to be activated and if the rendering value is equal to zero, then the pixel is not activated. Subsequent to obtaining the rendering value of the pixel, this value is written to the memory address previously determined (STEP 46).

After the rendering value for the first pixel of a line is obtained, the above procedure is repeated for each pixel defining the line until the end of the line is reached (INQUIRY 48). Thereafter, if the outline consists of additional lines that have not yet been identified (INQUIRY 50), the flow returns to STEP 38 "Identify Line, Direction and Octant Position." Otherwise, the technique for rendering an outline of the polygon terminates (STEP 52).

With reference to FIGS. 4-7, the aforementioned technique for rendering a polygon outline in accordance with the principles of the present invention is described in detail.

Figure 4:
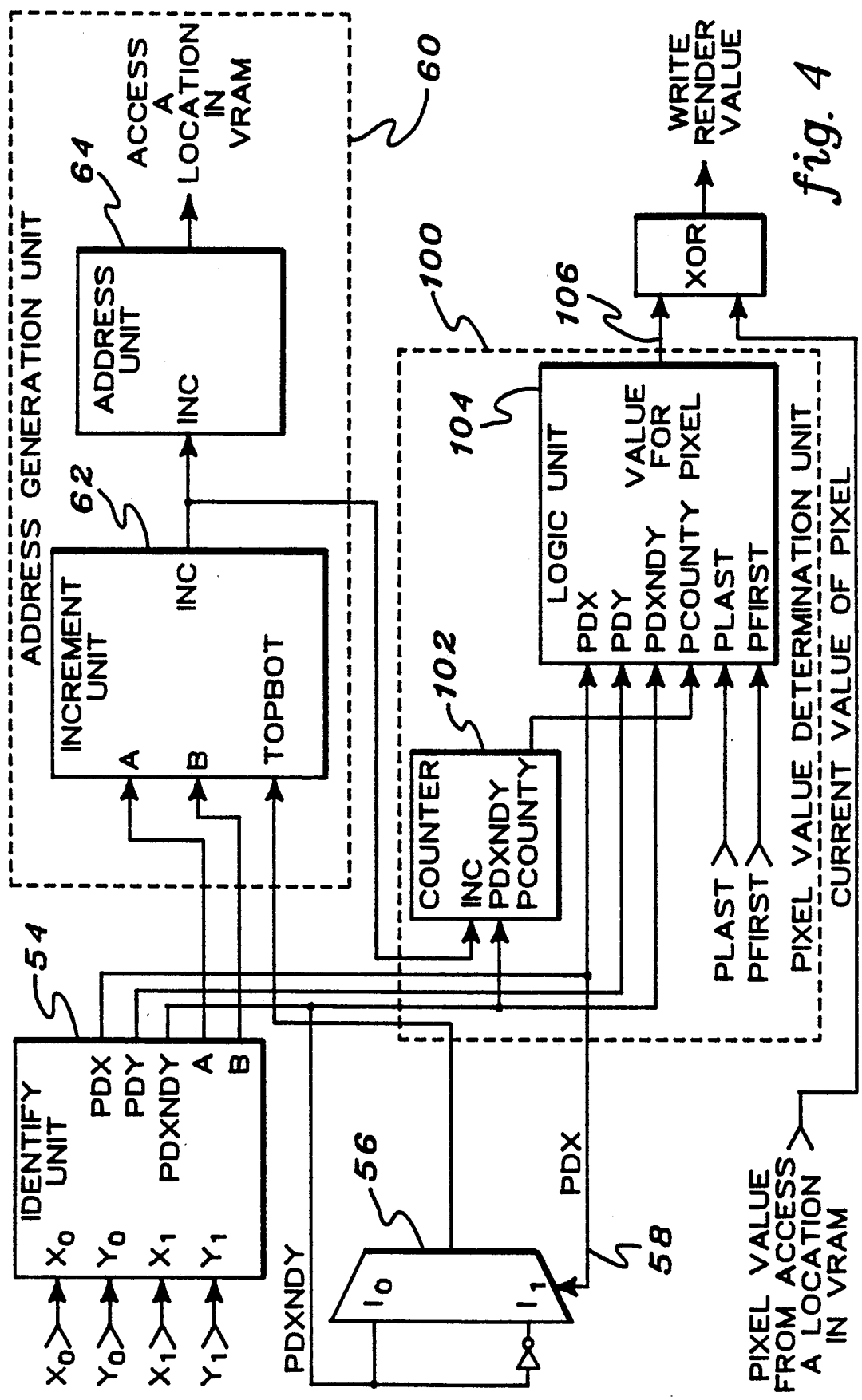
FIG. 4 is one example of a schematic block diagram of the rendering technique of FIG. 3, in accordance with the principles of the present invention.

Referring to the schematic block diagram of the outline rendering technique in FIG. 4, in order to identify one of the lines of the outline, an identify unit 54 consisting of standard combinatorial logic circuitry is used. Identify unit 54 is located, for example, in raster engine 18 (FIG. 1) and receives as input a beginning coordinate $(X_0, Y_0)$ and an ending coordinate $(X_1, Y_1)$ which identifies line 32. The beginning and ending coordinates are used, for instance, to determine whether the line is a horizontal line, a direction in which line 32 is to be rendered and an octant in which the line is located, as described below.

In one embodiment, in order to obtain the rendering direction of line 32, a comparison is made between the vertical component $(Y_1)$ of the ending coordinate and the vertical component $(Y_0)$ of the beginning coordinate (in an X, Y coordinate system) to determine the vertical direction in which the line is being drawn (i.e. in a positive or upward direction, or in a negative or downward direction). For instance, if $Y_1$ is greater than $Y_0$, then the line is being drawn in a positive direction and a signal referred to as PDY is set to one, in order to indicate the upward movement. On the other hand, if $Y_1$ is less than $Y_0$, then the line is being drawn in a negative direction and PDY is set to zero. As one example, if a beginning coordinate is (2,3) and an ending coordinate is (4,4), then $Y_1$ is greater than $Y_0$ and the line is rendered in a positive direction. In a further example, if a beginning coordinate is (1,4) and an ending coordinate is (1,3), then $Y_1$ is less than $Y_0$ and the line is rendered in a negative or downward direction. In accordance with the principles of the present invention, should $Y_1$ be equal to $Y_0$, then the line is a horizontal line and lines identified as horizontal are not rendered.

In addition to using the coordinates to obtain the rendering direction of a line, the coordinates are used to determine the horizontal direction in which the line is being drawn (i.e., in a positive X or negative X direction). In order to determine the direction along the X axis, a comparison is made between the horizontal component $(X_1)$ of the ending coordinate and the horizontal component $(X_0)$ of the beginning coordinate. Should $X_1$ be greater than $X_0$, then the line is being drawn in a positive X direction and a signal referred to as PDX is set to one, in order to indicate the positive movement. On the other hand, if $X_1$ is less than $X_0$, then PDX is set to zero indicating the line is drawn along the negative X axis. (As shown in FIG. 4, PDX and PDY are outputs of identify unit 54.)

In addition to using the coordinates as described above, the coordinates are used to determine which of eight octants (0 through 7) (FIG. 5) the line falls within. (Octants are similar to quadrants, which are known in the art, however, in accordance with the principles of the present invention, each quadrant is divided in half, thereby creating octants.) The particular octant in which the line is located depends on the values for PDY and PDX, described above, and on whether the change in the X (or horizontal) direction $(X_1 - X_0 = \Delta X)$ is greater than the vertical) direction $(Y_1 - Y_0 = \Delta Y)$. In one embodiment, if $\Delta X$ is greater than $\Delta Y$, then a signal representing the change, PDXNDY, is set to one. On the other hand, if $\Delta X$ is less than $\Delta Y$, then PDXNDY is set to zero. The following table illustrates which of the eight octants a line is located when PDX, PDY and PDXNDY have the following values:

| PDX | PDY | PDXNDY | OCTANT |
|-----|-----|--------|--------|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

Returning to identify unit 54 of FIG. 4, in addition to identifying a line of the outline and the direction and position of the line, a determination is made as to whether movement along the line is on a minor axis (A) and/or a major axis (B). The minor axis is the smaller of the two values of $\Delta X$ and $\Delta Y$ and the major axis is reflected in the larger of the two. For example, if a starting coordinate of line 32 is (0,0) and an ending coordinate is (3,2), then the minor axis (A) is the Y axis, since $\Delta Y$ (2−0=2) is less than $\Delta X$ (3−0=3).

Subsequent to obtaining the above information associated with a particular line of the outline, a signal referred to as TOPBOT is obtained. Signal TOPBOT indicates whether the pixels to the bottom of true line 32 or the top of line 32 are being drawn. For instance, if TOPBOT equals zero, the pixels below the line are drawn and when it is equal to one, the pixels above the line are drawn. In one embodiment, in order to select the value for TOPBOT, a standard two to one multiplexer (MUX) 56 is used. Multiplexer 56 receives as inputs the value for PDXNDY (input $I_0$), the value of PDXNDY inverted (input $I_1$) and a selection signal 58 and outputs a value for TOPBOT. In one embodiment, selection signal 58 is the value of PDX. Thus, if PDX is equal to zero, input $I_0$ is selected and the value of TOPBOT is equal to the value of PDXNDY. Otherwise, if PDX is equal to one, input $I_1$ is selected and the value of PDXNDY inverted represents the value of TOPBOT.

Subsequent to obtaining the minor axis, the major axis and TOPBOT, addresses of pixels which define the line are generated. In one example, one address is generated every clock cycle and when the end of one line is reached, the procedure is repeated for other lines of the outline. In order to generate an address, an address generation unit 60 including an increment unit 62 and an address unit 64, each of which includes a number of standard logic circuits such as inverters and selectors, is used as described below.

In one embodiment, increment unit 62 receives as input the values for the minor axis, the major axis and TOPBOT, respectively, and produces therefrom an increment value (INC), which indicates the amount of movement in the minor direction. Increment unit 62 is described in greater detail with reference to FIG. 6.

As illustrated in FIG. 6, in order to determine INC, initially, a subtractor 66 is used to generate a bottom line negative correction on line 68 and a bottom line initial determinant on line 70, each of which equal the value of A−B. (As used herein, bottom line refers to below the true or ideal line and top line refers to above the true line. As is known in the art, the initial determinant indicates the distance between a pixel and the true line and correction refers to an adjustment of the initial determinant.) In addition, minor axis (A) is used as a bottom line positive correction on line 72. Further, A is inverted and incremented by one in order to obtain −A, which is used as a top line negative correction on line 74 and a top line initial determinant on line 76. Also, the value of A−B is inverted and incremented by one in order to produce B−A, which reflects a top line positive correction on line 78.

The bottom line initial determinant (A−B) and the top line initial determinant (−A), described above, are input to a conventional 3-way selector 80 as $I_a$ and $I_b$, respectively. Also input to selector 80 are a new initial determinant value 82 as input $I_c$, and two select lines (select 0 and select 1). Each of these inputs are described herein.

In one embodiment, select 0 represents the value of TOPBOT and is used to control the selection of a right bit 84 of each two bit input (i.e., input $I_a$, $I_b$ and $I_c$). Select 1 represents a signal referred to as NEWLINE, which indicates whether the addresses to be generated are for a new line or an existing line, and it controls the selection of a left bit 86 of each two bit input. As described further below, new initial determinant 82 is equal to the output of a standard D-latch 88.

In order to obtain an output of 3-way selector 80 on line 90, select 0 and select 1 are used. For instance, if NEWLINE is equal to zero indicating that an address is being generated for a first pixel of the line (bit 86 is zero) and TOPBOT is equal to zero (bit 84 is equal to zero), then input $I_a$ representing the bottom line initial determinant is selected for output on line 90. However, if NEWLINE is equal to zero and TOPBOT is equal to one, then input $I_b$ representing the top line initial determinant is selected for output on line 90. Further, if NEWLINE is equal to one indicating that the address being generated is not the first pixel of a new line, but an additional pixel of an existing line, and TOPBOT is equal to either a one or a zero (an X in position 84 represents a don't care condition and as such, it can have the value of either a one or a zero), then the output on line 90 represents the value of the new determinant received from latch 88, described below.

Subsequent to obtaining an output value on line 90, the value is passed to a conventional two-to-one multiplexer 92 and a conventional 4-way selector 94, each of which are described below.

Multiplexer 92 receives as input the output value on line 90 which represents the most significant bit of the initial determinant, as well as the output value on line 90 inverted. One of these inputs is selected via select line 0 and the chosen input is output on line 95 as the value for the minor increment (INC). In one embodiment, when select line 0 (or TOPBOT) is equal to zero, then INC is equal to the most significant bit of the initial determinant, and when select line 0 is equal to one, INC is equal to the inverse of the most significant bit of the initial determinant. Should INC be equal to zero, then there is no increment in the minor direction; however, if INC is equal to one, then there is such an increment.

Selector 94 receives the bottom line negative correction (A−B), bottom line positive correction (A), top line negative correction (−A) and top line positive correction (B−A), as inputs $I_a$, $I_b$, $I_c$ and $I_d$, respectively, and two select lines, select 0 and select 1 produces therefrom an output value on line 96. Select 0 represents an inverse of the most significant bit of the initial determinant which is output on line 90 and select 1 represents the value of TOPBOT. Similar to 3-way selector 80, select 0 controls the right side of the inputs and select 1 controls the left side. Therefore, if select 1 is equal to a zero, then either input $I_a$ or $I_b$ is chosen depending on the value of select 0. For instance, if the output of 3-way selector 80 on line 90 is one (select 0 equals inverse of the value) and select 1 is zero, then the value of input $I_a$ is output on line 96. On the other hand, if the output on line 90 is zero and select 1 is zero, then the value of input $I_b$ is output on line 96. Further, if select 1 is equal to one, then either input $I_c$ or $I_d$ is chosen depending on the value of select 0. Therefore, assuming select 1 is equal to one, should select 0 equal a zero, then the value of input $I_c$ is output on line 96 and if select 0 equals a one, then the value of input $I_d$ is output on line 96.

The output on line 96 is subsequently passed as an input, $I_0$, to an adder 98. Also input to adder 98 as input $I_1$ is the output on line 90 from 3-way selector 80. Adder 98 is operable on each clock cycle and adds the values of the two inputs and stores the result in D-latch 88. As described above, the output of latch 88 is input to 3-way selector 80 as the new initial determinant 82. This new initial determinant is used in obtaining the minor axis increment (INC) when the address being generated is not of the first pixel of a line.

After the increment in the minor direction is determined, as described in detail above, then referring to FIG. 4, the value of the increment is an input to address unit 64. Address unit 64 generates X and Y addresses for accessing, e.g., frame buffer 23. Address unit 64 normally increments the X and Y addresses along the major axis only, but increments the addresses diagonally along both axes, in response to the increment minor value obtained above. The above technique for generating addresses is described in detail in copending commonly assigned U.S. patent application Ser. No. 07/902,324, entitled "Method and Apparatus For Drawing Antialiased Lines On A Raster Display" filed on Jun. 22, 1992, which is hereby incorporated by reference. (A further procedure for generating addresses, referred to as the Bresenham procedure, is described in J. D. Foley et al, *Fundamentals of Interactive Computer Graphics* (1982), pp 433–436, which is also incorporated herein by reference.)

In addition to passing the value of the increment in the minor direction to address unit 64, the value is input to a pixel value determination unit 100 and in particular to a counter 102, which keeps track of the increments in the Y direction. For instance, if Y is in the major direction (PDXNDY=0), then at every clock cycle, a signal referred to as PCOUNTY is updated to reflect the movement in the Y direction, and if Y is in the minor direction (PDXNDY=1), then each time INC is equal to one reflecting an increment in the minor direction, PCOUNTY is also incremented.

Figure 7:
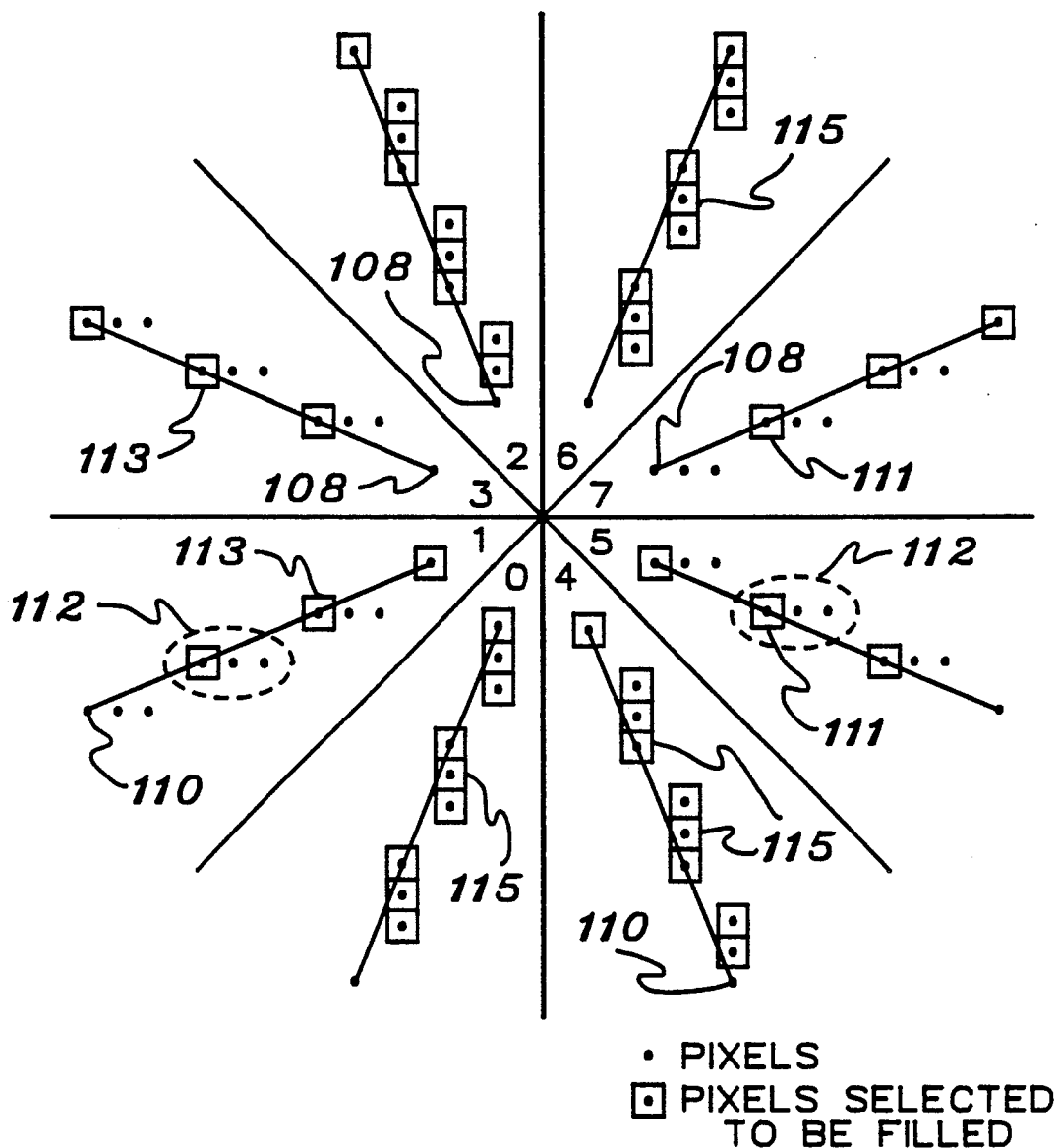
FIG. 7 illustrates one example of pixels representing a line which may be rendered, in accordance with the principles of the present invention.

As illustrated in FIG. 4, PCOUNTY is one of the inputs of a logic unit 104 used to determine a value for the pixel which is to be rendered, as described in further detail below. Also input to logic unit 104 are PDX, PDY, PDXNDY, all described above, and signals PLAST and PFIRST, described herein. As illustrated in FIG. 7, PLAST refers to a last pixel 110 of a particular line and PFIRST refers to a first pixel 108 of the line. For instance, if a particular line is defined by beginning coordinates (1,1) and ending coordinates (6,4), then PFIRST represents the pixel defining (1,1) and PLAST represents the pixel defining (6,4). In accordance with the principles of the present invention, the inputs of logic unit 104 are used to output a value for a particular pixel.

Logic unit 104 includes logic circuitry which is based on a set of rules for determining the value of a particular pixel of an identified line to be rendered. Once again, if a line is a horizontal line, it will not be identified as a line to be rendered. As described below, this value is then used to determine if the pixel is to be rendered. In accordance with the principles of the present invention, the set of rules include the following:

1. When lines are drawn in a positive direction, the first pixel of the line is not drawn. As shown in FIG. 7, lines drawn in octants 2, 3, 6 and 7 are drawn in a positive direction, and therefore, the first pixel 108 is not drawn. (In FIG. 7, pixels to be drawn are surrounded by a square.)
2. When lines are drawn in a negative direction, the last pixel of the line is not drawn. As illustrated in FIG. 7, lines drawn in octants 0, 1, 4 and 5 are drawn in a negative direction, and therefore, the last pixel 110 is not drawn.
3. Only one pixel is drawn for every integer movement in the minor direction. That is, for lines drawn in octants five and seven, a first pixel 111 of each horizontal group of pixels 112 is rendered, and for lines drawn in octants one and three, a last pixel 113 of each horizontal group of pixels is rendered. As illustrated in FIG. 7, a horizontal group of pixels 112 refers to a group of horizontally adjacent pixels. In one embodiment, signal PCOUNTY is equal to one when the pixel is the last pixel of a horizontal group of pixels. Further, in order to determine the first pixel of a horizontal group of pixels, a delayed PCOUNTY signal, described below is used. When the delayed PCOUNTY signal is equal to one, then it is the first pixel of the horizontal group of pixels.
4. The pixel is drawn if the center of the pixel lies on or to the right of the line. As shown in FIG. 7, for example, pixels 115 satisfy this criteria.

Figure 8:
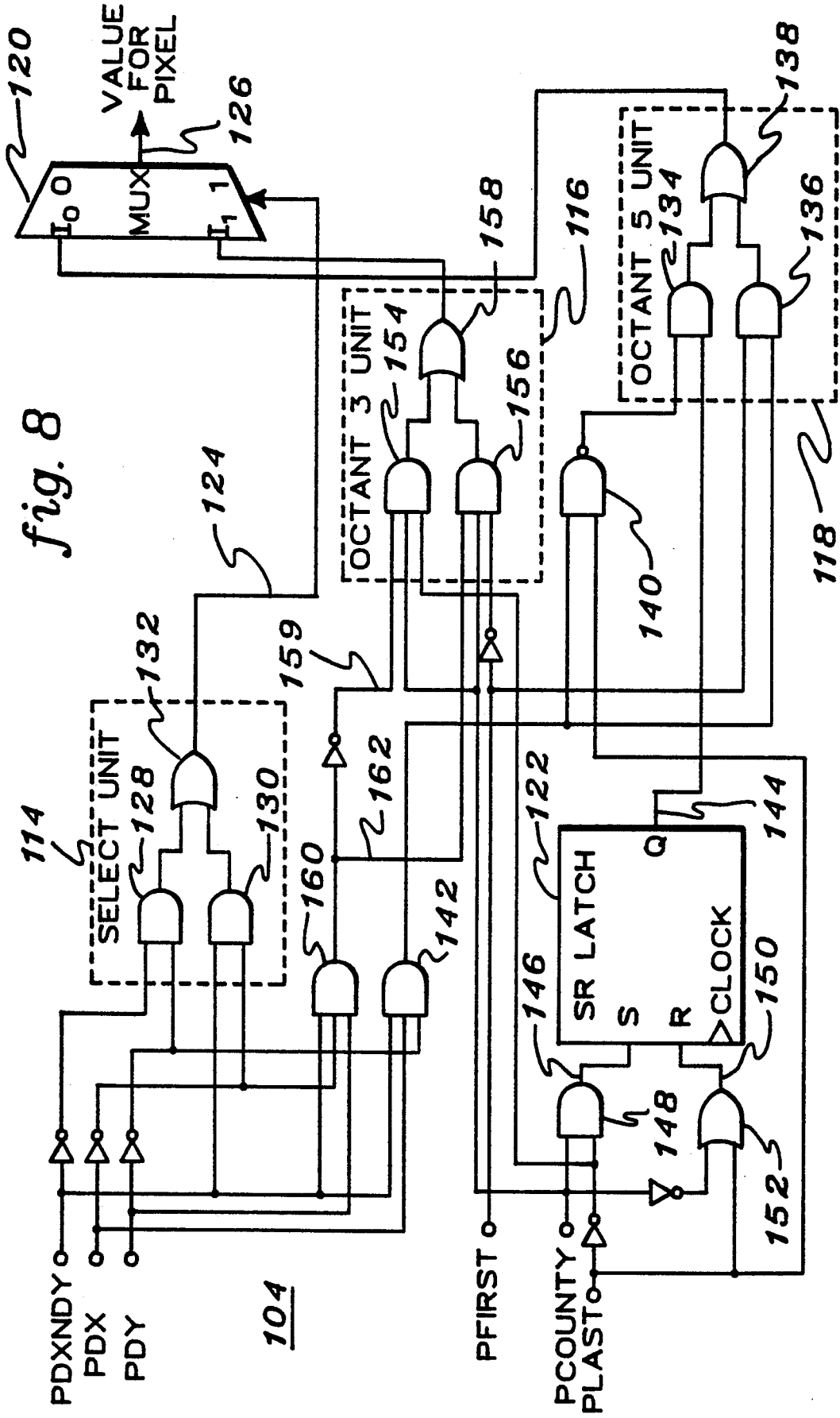
FIG. 8 depicts one example of the logic circuitry of the logic unit depicted in FIG. 4 and in accordance with the principles of the present invention.

The logic circuitry used to obtain a pixel value based on the above rules is described in detail with reference to FIG. 8. Logic unit 104 includes, for example, a select unit 114, an octant 3 unit 116, an octant 5 unit 118, a standard multiplexer 120 and a conventional SR-latch 122. Each of these components is described in detail herein.

Select unit 114 produces an output value on line 124 which is used to select between the two inputs, $I_0$ and $I_1$, of multiplexer 120. The value of the chosen input is output on line 126 and represents the pixel value. If, for instance, the output on line 124 is equal to one, then input $I_1$ is selected; however, if the output on line 124 is equal to zero, then input $I_0$ is chosen.

Select unit 114 includes two standard two input AND gates 128, 130, respectively, and one standard two input OR gate 132. The inputs to AND gate 128 include the value of PDXNDY inverted and the value of PDY inverted, and the inputs to AND gate 130 include the value of PDXNDY and the value of PDX inverted. The output of each AND gate is input to OR gate 132. As described above, the output of OR gate 132 is used to select between the two inputs of multiplexer 120.

Input $I_0$ of multiplexer 120 is the output of octant 5 unit 118, which indicates whether the pixel is in octant two, five, six or seven. As described above, if the pixel is in octant five or seven and it is the first pixel of a horizontal group of pixels, then, at this time, this pixel is to be rendered. Similar to select unit 114, octant 5 unit 118 includes two conventional two input AND gates 134, 136 and one standard two input OR gate 138. One of the inputs to AND gate 134 is the output of a standard two input NAND gate 140, which has as its inputs the value of PLAST and the output of a standard three input AND gate 142. AND gate 142 receives as input an inverted value of PDY, PDX and PDXNDY. The other input to AND gate 134 is an output 144 of SR-latch 122.

SR-latch 122 receives as its input an output 146 of a standard two input AND gate 148 and an output 150 of a standard two input OR gate 152. AND gate 148 receives the value of PCOUNTY and the value of PLAST inverted as its inputs and OR gate 152 receives as input an inverted value of PCOUNTY and the value of PLAST. SR-latch 122 is clocked and is used in delaying the output on line 144 which is to be input to octant 5 unit 118. That is, the output on line 144 is delayed by one clock cycle in order to determine whether the pixel is the first pixel in a horizontal group of pixels, as described herein. This is important for octants five and seven, since the first pixel in each horizontal group of pixels in those octants is to be rendered.

Input $I_1$ of multiplexer 120 is the output of octant 3 unit 116, which includes two standard three input AND gates 154, 156 and one standard two input OR gate 158. Octant 3 unit 116 is used in the determination of whether the pixel is in the zero, first, third or fourth octant. As described above, if the pixel is in the first or third octant, then the last pixel of the horizontal group may be rendered.

The inputs of AND gate 154 include an inverted output on line 159 of a three input AND gate 160, the value of PCOUNTY and the value of PLAST inverted. The inputs of AND gate 156 include the output on line 162 of AND gate 160, the value of PCOUNTY and an inverted value of PFIRST. AND gate 160 receives as input the value of PDY, the value of PDXNDY and the inverted value of PDX.

At this point, a couple of examples illustrating the above rules will be discussed with reference to the circuitry in FIG. 8. In the first example, the below listed signals have the following values:

| PDXNDY | PDX | PDY | PFIRST | PCOUNTY | PLAST |
| --- | --- | --- | --- | --- | --- |
| 0 | 1 | 1 | 0 | 1 | 1 |

Using the above values, the output on line 124 is equal to zero and therefore, input $I_0$ is selected. As described above, input $I_0$ is equal to the output of octant 5 unit 118, which determines whether a pixel positioned in octant two, five, six or seven is to be rendered. Since the output on line 144 is delayed by one clock cycle, assume for this example that the output on line 144 is equal to one. In particular, during the previous clock cycle, the value of PLAST inverted and PCOUNTY was input to AND gate 148 and the value of PLAST and PCOUNTY inverted was input to OR gate 152. The outputs of those two gates were input to clocked SR-latch 122 which produced the output on line 144. Since both inputs to AND gate 134 are one, the output of AND gate 134 is a one as well as the output of OR gate 138. Therefore, the pixel is to be rendered. This is consistent with the above set of rules. To confirm, using the above values for PDXNDY, PDY and PDX, it is determined that the pixel is in the sixth octant and using the above rules, this pixel is to be rendered unless it is determined later on that it shall not be rendered, as described herein.

In the second example, the below listed signals have the following values:

| PDXNDY | PDX | PDY | PFIRST | PCOUNTY | PLAST |
|--------|-----|-----|--------|---------|-------|
| 1      | 0   | 1   | 0      | 1       | 1     |

Using the above values, the output on line 124 is equal to one and therefore, input $I_1$ is selected. As described in detail above, input $I_1$ reflects the output of OR gate 158. Therefore, if the output is equal to a one, then the value of the pixel is one and, if the output is zero, then the pixel value is zero. OR gate 158 is part of octant 3 unit 116 which is used to determine if the pixel is in the zero, first, third or fourth octant. Should the pixel be in either the first or third octant and it is the last pixel of the horizontal group, then the pixel value should be one.

The inputs to OR gate 158 are the outputs of AND gates 154 and 156, therefore, these values are obtained. Since the input on line 159 is a zero, the output of gate 154 is zero. Similarly, since all the inputs to gate 156 in this example equal one, the output of AND gate 156 is one. Based on the foregoing, the output of OR gate 158 is a one, and therefore, the value of input $I_1$ is also a one. Thus, the pixel is to be rendered unless its value is changed later on in the procedure, as described below. To confirm, since PDX equals zero, PDY equals one and PDXNDY equals one, the pixel is positioned in the third octant. According to the rules of the present invention, for lines drawn in octant three, the last pixel of the horizontal group is rendered.

Referring once again to FIG. 4, subsequent to determining a value for the pixel, that value is input to a conventional exclusive OR gate (XOR). In addition, the current value of the pixel located in the VRAM at the address obtained from address generation unit 60 is input to the exclusive OR gate. The two inputs are used to determine a rendering value for the particular pixel. That is, if the exclusive OR operation produces a zero, then the pixel is not activated; however, if the rendering value is a one, then the pixel is activated.

In accordance with the principles of the present invention, the rendering value for each pixel that defines a line of the outline is written to frame buffer 23, which is, for example, a one bit frame buffer. After the outline is rendered to the one bit frame buffer, the outline is filled, as described below.

The polygon is filled by, for example, using a known edge sorting routine, which has been modified in accordance with the principles of the present invention. During the edge sorting routine, a bit block transfer (BitBlt) operation is performed. BitBlt is described in detail in *Computer Graphics Principles and Practice,* J. D. Foley et al., 2nd edition, (1990), which is hereby incorporated by reference.

In particular, the polygon is filled using the following rules which are described with reference to FIG. 9. Referring to FIG. 9, when the filling procedure begins, STEP 170 "Start," initially, in accordance with the principles of the present invention, a smallest rectangle surrounding the polygon to be filled is created, STEP 172 "Determine Rectangle Bounding The Polygon to be Filled." The coordinates for the bounding rectangle are actually determined, in one embodiment, during the outline rendering procedure. The rectangle is determined by obtaining the minimum and maximum X values and the minimum and maximum Y values of the rectangle surrounding the polygon.

Subsequently, scanning of the first horizontal line of the rectangle begins at the leftmost side of the rectangle, STEP 174 "Scan a Scan line of the Outline." (Each horizontal line to be scanned is referred to as a scan line.) The scanning moves along the scan line from left to right searching for an active pixel of the polygon outline, which is stored in frame buffer 23. When an active pixel is found during the reading of the one bit frame buffer 23, INQUIRY 176 "Polygon Outline Found," a fill indicator is set and the active pixel is rendered in the visible frame buffer, i.e., frame buffer 22, STEPS 178, 180 "Set Flag" and "Render Pixel." Pixels continue to be rendered until another active pixel is found in one bit frame buffer 23, INQUIRY 182 "Has Another Active Pixel Been Found?" When another active pixel has been encountered, in accordance with the principles of the present invention, the fill indicator is turned off, STEP 184 "Turn Flag Off," and that pixel is not rendered in the visible frame buffer, STEP 186 "Do Not Render Last Pixel." The above procedure is repeated until the end of the scan line is reached, INQUIRY 188 "Is Scanning of Line Complete?" If the end of the line is reached, the procedure is repeated for each scan line of the outline, INQUIRY 189 "Have All Lines Been Scanned?" If all of the scan lines comprising the rectangular area have been scanned, then the filling procedure is complete, STEP 190 "End."

Described in detail above is a technique for rendering polygon outlines in a one bit frame buffer and then filling the outline by writing the appropriate pixels to a visible frame buffer. The technique of the present invention advantageously conforms to the known X Window EvenOdd rules for rendering polygons.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for rendering a polygon outline in a graphics processor, said polygon outline comprising a plurality of lines, said method comprising the steps of:
   (a) identifying each line to be rendered, each line comprising a number of pixels;
   (b) determining a rendering direction and an octant position for each line;
   (c) using a set of rules to determine a value for each pixel, said set of rules comprising:

setting said value to a first value when said pixel is
  a first pixel of one of said lines and said rendering
  direction of said line is positive;
setting said value to said first value when said pixel
  is a last pixel of said line and said rendering direction is negative;
setting said value to a second value when one of a
  plurality of conditions exists, said plurality of
  conditions comprising a center of said pixel lies
  on said line, said pixel is a first pixel of a horizontal group of pixels of said line and said line is
  positioned in one of a fifth and a seventh octant,
  and said pixel is a last pixel of a horizontal group
  of pixels of said line and said line is positioned in
  one of a first and a third octant;
(d) for each pixel determining a current pixel value
  and exclusive ORing said current pixel value with
  said determined value of said pixel to determine a
  render value for said pixel; and
(e) writing each said render value to a buffer such
  that a polygon outline is rendered.

2. The method of claim 1, wherein said identifying step comprises the step of using a beginning coordinate and an ending coordinate to identify said line.

3. The method of claim 2, wherein said beginning coordinate includes a first horizontal component and a first vertical component and said ending coordinate includes a second horizontal component and a second vertical component.

4. The method of claim 3, wherein said rendering direction step includes the step of comparing said first vertical component and said second vertical component to determine said rendering direction.

5. The method of claim 4, wherein said rendering direction is a positive direction when said comparing step results in said second vertical component having a greater value than said first vertical component.

6. The method of claim 4, wherein said rendering direction is a negative direction when said comparing step results in said second vertical component having a lesser value than said first vertical component.

7. The method of claim 1, wherein said octant position determining step includes the steps of:
comparing said first horizontal component with said
  second horizontal component to obtain a horizontal direction;
comparing said first vertical component with said
  second vertical component to obtain a vertical
  direction;
subtracting said first horizontal component from said
  second horizontal component to obtain a horizontal change in said horizontal direction;
subtracting said first vertical component from said
  second vertical component to obtain a vertical
  change in said vertical direction;
determining a change signal by comparing said horizontal change with said vertical change; and
determining an octant position by using said horizontal direction, said vertical direction and said change
  signal.

8. The method of claim 7, wherein said horizontal direction is a positive direction when said comparing step results in said second horizontal component having a greater value than said first horizontal component and said horizontal direction is a negative direction when said comparing step results in said second horizontal component having a lesser value than said first horizontal component.

9. The method of claim 8, wherein said vertical direction is a positive direction when said comparing step results in said second vertical component having a greater value than said first vertical component and said vertical direction is a negative direction when said comparing step results in said second vertical component having a lesser value than said first vertical component.

10. The method of claim 9, wherein said line is positioned in said fifth octant when said horizontal direction is positive, said vertical direction is negative and said change signal is active.

11. The method of claim 9, wherein said line is positioned in said seventh octant when said horizontal direction is positive, said vertical direction is positive and said change signal is active.

12. The method of claim 9, wherein said line is positioned in said first octant when said horizontal direction is negative, said vertical direction is negative and said change signal is active.

13. The method of claim 9, wherein said line is positioned in said third octant when said horizontal direction is negative, said vertical direction is positive and said change signal is active.

14. The method of claim 1, wherein said buffer is a one bit buffer.

15. The method of claim 1, wherein said first value is a zero and said second value is a one.

16. The method of claim 1, further comprising the step of filling said rendered polygon outline.

17. The method of claim 16, wherein said filling step comprises the steps of:
(a) determining a rectangle surrounding said rendered
  polygon outline to be filled, said rectangle defining
  an area comprising a plurality of scan lines;
(b) scanning each scan line to determine sets of active
  pixels in each scan line, each set comprising a first
  active pixel and a second active pixel, said first and
  second active pixels having inactive pixels there
  between; and
(c) for each scan line rendering said first active pixels
  in each set of active pixels and rendering said inactive pixels in between said set of active pixels.

18. The method of claim 17, further comprising the step of setting an indicator active when said first active pixel is determined.

19. The method of claim 18, further comprising the step of setting an indicator inactive when said second active pixel is determined.

20. A system for rendering a polygon outline in a graphics processor, said polygon outline comprising a plurality of lines, said system comprising:
means for identifying each line to be rendered, each
  line comprising a number of pixels;
means for determining a rendering direction and an
  octant position for each line;
means for using a set of rules to determine a value for
  each pixel, said set of rules comprising:
setting said value to a first value when said pixel is
  a first pixel of one of said lines and said rendering
  direction of said line is positive;
setting said value to said first value when said pixel
  is a last pixel of said line and said rendering direction is negative;
setting said value to a second value when one of a
  plurality of conditions exists, said plurality of
  conditions comprising a center of said pixel lies
  on said line, said pixel is a first pixel of a horizontal group of pixels of said line and said line is positioned in one of a fifth and a seventh octant, and said pixel is a last pixel of a horizontal group of pixels of said line and said line is positioned in one of a first and a third octant;

means for determining for each pixel a current pixel value and exclusive ORing said current pixel value with said determined value of said pixel to determine a render value for said pixel; and means for writing each said render value to a buffer such that a polygon outline is rendered.

21. The system of claim 20, wherein said identifying means comprises means for using a beginning coordinate and an ending coordinate to identify said line.

22. The system of claim 21, wherein said beginning coordinate includes a first horizontal component and a first vertical component and said ending coordinate includes a second horizontal component and a second vertical component.

23. The system of claim 22, wherein said rendering direction means includes means for comparing said first vertical component and said second vertical component to determine said rendering direction.

24. The system of claim 23, wherein said rendering direction is a positive direction when said means for comparing results in said second vertical component having a greater value than said first vertical component.

25. The system of claim 23, wherein said rendering direction is a negative direction when said comparing means results in said second vertical component having a lesser value than said first vertical component.

26. The system of claim 20, wherein said octant position determining means comprises:

means for comparing said first horizontal component with said second horizontal component to obtain a horizontal direction;

means for comparing said first vertical component with said second vertical component to obtain a vertical direction;

means for subtracting said first horizontal component from said second horizontal component to obtain a horizontal change in said horizontal direction;

means for subtracting said first vertical component from said second vertical component to obtain a vertical change in said vertical direction;

means for determining a change signal by comparing said horizontal change with said vertical change; and means for determining an octant position by using said horizontal direction, said vertical direction and said change signal.

27. The system of claim 26, wherein said horizontal direction is a positive direction when said comparing means determines said second horizontal component has a greater value than said first horizontal component and said horizontal direction is a negative direction when said comparing means determines said second horizontal component has a lesser value than said first horizontal component.

28. The system of claim 27, wherein said vertical direction is a positive direction when said comparing means determines said second vertical component has a greater value than said first vertical component and said vertical direction is a negative direction when said comparing means determines said second vertical component has a lesser value than said first vertical component.

29. The system of claim 28, wherein said line is positioned in said fifth octant when said horizontal direction is positive, said vertical direction is negative and said change signal is active.

30. The system of claim 28, wherein said line is positioned in said seventh octant when said horizontal direction is positive, said vertical direction is positive and said change signal is active.

31. The system of claim 28, wherein said line is positioned in said first octant when said horizontal direction is negative, said vertical direction is negative and said change signal is active.

32. The system of claim 28, wherein said line is positioned in said third octant when said horizontal direction is negative, said vertical direction is positive and said change signal is active.

33. The system of claim 20, wherein said buffer is a one bit buffer.

34. The system of claim 20, wherein said first value is a zero and said second value is a one.

35. The system of claim 20, further comprising means for filling said rendered polygon outline.

36. The system of claim 35, wherein said filling means comprises:

means for determining a rectangle surrounding said rendered polygon outline to be filled, said rectangle defining an area comprising a plurality of scan lines;

means for scanning each scan line to determine sets of active pixels in each scan line, each set comprising a first active pixel and a second active pixel, said first and second active pixels having inactive pixels there between; and means for rendering said first active pixels in each set of active pixels and rendering said inactive pixels in between said set of active pixels.

37. The system of claim 36, further comprising means for setting an indicator active when said first active pixel is determined.

38. The system of claim 36, further comprising means for setting an indicator inactive when said second active pixel is determined.

* * * * *